United States Patent [19]

Yodice

[11] Patent Number: 4,960,761
[45] Date of Patent: Oct. 2, 1990

[54] HIGH SURFACE AREA POLYMERS OF PYRROLE OR COPOLYMERS OF PYRROLE

[75] Inventor: Richard Yodice, Willoughby, Ohio

[73] Assignee: The Lubrizol Corporation, Wickliffe, Ohio

[21] Appl. No.: 276,999

[22] Filed: Nov. 28, 1988

Related U.S. Application Data

[62] Division of Ser. No. 65,159, Jun. 24, 1987, Pat. No. 4,839,322.

[51] Int. Cl.$^5$ .............................................. B01J 31/06
[52] U.S. Cl. .................................... 502/159; 502/150; 502/153; 502/152; 502/167; 502/162; 502/101
[58] Field of Search ............... 502/159, 150, 153, 152, 502/167, 162, 101

[56] References Cited

U.S. PATENT DOCUMENTS

| | | | |
|---|---|---|---|
| 4,401,545 | 8/1983 | Naarmann et al. | 204/291 |
| 4,442,187 | 4/1984 | MacDiarmid et al. | 429/213 |
| 4,468,291 | 8/1984 | Naarmann et al. | 204/13 |
| 4,547,270 | 10/1985 | Naarmann | 204/58.5 |
| 4,552,857 | 11/1985 | Katz et al. | 502/101 |
| 4,566,955 | 1/1986 | Naarmann | 204/59 R |
| 4,607,083 | 8/1986 | Muenstedt et al. | 525/417 |
| 4,608,129 | 8/1986 | Tamamura et al. | 204/18.1 |
| 4,839,322 | 6/1989 | Yodice | 502/159 |

OTHER PUBLICATIONS

Gardini, Adv. Heterocycl. Chem, 15, 67(1973).
A. Dall'olio et al, Comp. Rend., 433, 267C (1968).
Diaz et al, J. Chem. Soc, Chem. Comm., 635, (1979).
Diaz et al, J. Chem. Soc. I, Chem. Comm., 397(1980).
Diaz, Chemica Scripta, 17, 45 (1981) (should be 145).
Kanazawa et al, J. Chem. Soc., Chem. Comm., 954 (1979) (should be 854).
Diaz et al, J. Electroanal Chem., 129, 115 (1981).
Diaz et al, J. Electroanal Chem., 130, 181 (1981).
Diaz, Proc. Int. Conf. on Low Dimensional Synthetic Metals Chemica Scripta, 17 (1981).
Kanazawa et al, J. Synth Metals, 4, 119 (1981).
Kanazawa et al, Syn, Metals, 329 (1980).
Noufi et al, J. Electrochem. Soc., 128 2596 (1981).
Diaz et al, Electrochemical Society Extended Abstracts, vol. 82-1, Abstract No. 617 (1982).
Tourillon et al, Electrochemical Society Extended Abstracts, vol. 82-1, Abstract No. 618 (1982).
Diaz et al, J. Electroanal. Chem., 121, 355 (1981).
Watanabe et al, Bull. Chem. Soc. Jpn., 54, 2278 (1981).
Bull et al, J. Electrochem. Soc., 128, 1009 (1982).
Diaz et al, Polymer Sci. & Technology, p. 149 et. seq., Plenum Press, N.Y., "Conducting Polymers"(not available).
Inganaes et al, J. Phys. Chem. Solids, vol. 48, No. 4, pp. 427–432 (should be vol. 45).

Primary Examiner—Patrick P. Garvin
Assistant Examiner—E. D. Irzinski
Attorney, Agent, or Firm—Forrest L. Collins; Frederick D. Hunter; Robert A. Franks

[57] ABSTRACT

Polymers of pyrrole or copolymers of pyrrole are obtained having high surface area and low conductivity. Such polymers and copolymers are useful in forming catalysts.

12 Claims, No Drawings

HIGH SURFACE AREA POLYMERS OF PYRROLE OR COPOLYMERS OF PYRROLE

This application is a divisional of co-pending application Ser. No. 07/065,159 filed June 24, 1987 now U.S. Pat. No. 4,839,322, which is a continuation of Ser. No. 859,571 filed May 5, 1986 which is now abandoned.

BACKGROUND OF THE INVENTION

1. Field of the Invention

This invention describes materials formed from pyrrole or copolymers of pyrrole exhibiting high surface area.

2. Description of the Art

It is known that polymers of pyrrole and copolymers of pyrrole may be obtained as electronically conducting organic polymers. Such materials have been known to have conductivities exceeding 1 ohm$^{-3}$ cm$^{-1}$. It is further known that materials of a similar class include polyacetylene, poly-p-phenylene, poly-p-phenylene sulfide, polyaniline and poly (2,5 thienylene).

Pyrrole black, a polymeric powdered material formed by oxidizing pyrrole in homogeneous solution (e.g. with $H_2O_2$) has been known for many years. Gardini, *Adv. Heterocycl. Chem*, 15, 67(1973). An electrochemical method of producing polypyrrole as a powdery film on an electrode has been reported. A. Dall' olio et al., *Comp. Rend.*, 433, 267c (1968). Electropolymerization to produce polymer films from pyrrole has been reported. Diaz et al, *J. Chem. Soc, Chem. Comm.*, 635, (1979) (hereinafter Diaz (I)); Diaz et al, *J. Chem. Soc.I, Chem. Comm.*, 397, (1980) (hereinafter Diaz (II)); Diaz, *Chemica Scripta*, 17, 45, (1981) (hereinafter Diaz (III)); and Kanazawa et al., *J. Chem. Soc., Chem. Comm.*, 954 (1979) (hereinafter Kanazawa (I)). Electropolymerized polypyrrole from substituted pyrroles has been reported Diaz (II); Diaz et al., *J. Electroanal Chem.*, 129, 115, (1981) (hereinafter Diaz (IV)); Diaz et al., *J. Electroanal Chem.*, 130, 181, (1981) (hereinafter Diaz (V)). Co-polymer films produced by electropolymerizing mixtures of pyrrole and substituted pyrrole have also been reported. A mixture of pyrrole and N-methyl pyrrole has been polymerized and it is believed that both monomers are incorporated into the polymer Diaz (II); Diaz, *Proc. Int. Conf. on Low Dimensional Synthetic Metals Chemica Scripta*, 17, 0000, (1981) (hereinafter Diaz (VI; and Kanazawa et al *J. Synth Metals*, 4, 119, (1981) (hereinafter Kanazawa (II)).

Polypyrrole is electronically conducting in the charged or oxidized state (black), and is produced in this state by electropolymerization. When completely reduced to the neutral or discharged state (yellow), it is an electronic insulator. The electropolymerized polypyrrole is produced in the oxidized, i.e. conductive, state and (unlike other conducting polymers such as polyacetylene) does not require any subsequent chemical or electrochemical treatment to increase its conductivity above 1 ohm$^{-1}$ cm$^{-1}$. A counter-anion is incorporated into the material during the electropolymerization process to balance the positive charge on the polymer backbone. Diaz (III).

Polypyrrole can also be electropolymerized as a continuous film on electrodes. The highest electronic conductivities reported for the continuous films are of the order of about 100 ohm$^{-1}$ cm$^{-1}$. Diaz (I); Kanazawa et al., *Syn. Metals*, 329, (1980) (hereinafter Kanazawa (III)). These conductivities can be orders of magnitude lower depending on the counter-anion incorporated.

A large number of counter-anions have been used, including $BF_4^-$, $PF_6^-$, $AsF_6^-$, $ClO_4^-$, $HSO_4^-$, $CF_3SO_3^-$, $CH_3C_6H_4SO_3^-$, $CF_3COO^-$, $HC_2O_4^-$, $Fe(CN)_6^{3-}$. Diaz (IV); Diaz (VI); Kanazawa (I); and Noufi et al, *J. Electrochem. Soc.*, 128 2596, (1981).

N-substituted pyrroles have been polymerized, including methyl, ethyl, n-propyl, n-butyl, isobutyl and phenyl and substituted phenyl pyrroles Diaz (IV); Diaz et al., *Electrochemical Society Extended Abstracts*, Vol. 82-1. Abstract No. 617, (1982) (hereinafter Diaz (VII)). These materials have reported electronic conductivities orders of magnitude lower than polypyrrole itself. Kanazawa (II); Diaz (VII), It has been reported that beta-substituted pyrroles such as 3,4 dimethyl pyrrole have been polymerized. Gardini, supra.

The polymers have been prepared to date with non-aqueous solvents, typically acetonitrile, (Diaz (I); Diaz (II); and Diaz (VI)), containing a dissolved salt which provides the counter-anion. It is known that the physical properties of the resulting films are sensitive to the formation conditions. For example, in acetonitrile, small traces of water in the solvent produce a film with a smoother surface than that produced in anhydrous acetonitrile Diaz (VI). The polypyrrole tetrafluoroborate films produced by Diaz et al. are continuous, space-filling and very poorly crystalline with a density of 1.48 g cm$^{-3}$. Kanazawa (III).

Polypyrrole films are thermally stable at room temperature and are insoluble in common solvents. Diaz (I); Kanazawa (II); and Tourillon et al., *Electrochemical Society Extended Abstracts*, Vol. 82-1, Abstract No. 618, (1982). Polypyrrole in the oxidized form is reported to be chemically stable in ambient conditions of $O_2$ and moisture for several months. Diaz et al., *J. Electroanal. Chem.*, 121, 355, (1981) (hereinafter Diaz (VIII)); Watanabe et al, *Bull. Chem. Soc. Jpn.*, 54, 2278, (1981). Polypyrrole fluoroborate films have been shown to be unstable under oxidative conditions such as potentials greater than +0.6 v. (SCE) or in the presence of halogens. Bull et al, *J. Electrochem. soc.*, 129, 1009. (1982).

Polypyrrole can be driven repeatedly between the conducting and non-conducting state. Bull et al, *supra*; Diaz et al, "Conducting Polymers", *Polymer Sci. & Technology*, p. 149 et. seq., Plenum Press, N.Y., (1981) (hereinafter Diaz (IX)). Rapid complete switching is reported to require the use of thin films (i.e., less than about 0.1 micrometer) and switching is difficult for thicknesses greater than about 1 micrometer. Diaz (II); Diaz (IX). It has been shown that although a film may contain $BF_4^-$ counter-anions when it is formed (i.e., is the charged state), $BF_4^-$ is no longer present in the film when it is in the neutral (i.e., reduced or discharged) state. Diaz (IV). It has been suggested that both the anion and the cation of the electrolyte salt affect ion diffusion during reduction and oxidation of polypyrrole films. Diaz (IV).

Polymers have been produced with different degrees of oxidation, depending on the anion and/or substituents. Most of these materials have degrees of oxidation around 0.25 (i.e., one quarter of the polymer rings are oxidized). In an article entitled "Proton Modification of Conducting Polypyrrole", *J. Phys. Chem. Solids*, Volume 48, No. 4, pages 427–432, Inganaes et al reported that the deprotonation of polypyrrole may be accomplished through the use of caustic.

It is not currently known that a polymer of pyrrole or copolymer of pyrrole can be made having a significantly higher surface area. It is highly desirable to have a high surface polymer which is essentially nonreactive as it may be used as a catalyst support such as for a Friedel Crafts catalyst or an oxygen reduction electrode.

It has been found that by treating the polymers, for instance, which are obtained according to U.S. Ser. No. 460,695 now abandoned filed Jan. 24, 1983 that suitable precursors for high surface area polymers may be obtained. Specifically, it has been found that the processing in the aforementioned application allows for the polymers of pyrrole or copolymers of pyrrole to be deprotonated thereby rendering an extremely high surface area polymer which is suitable as a catalyst support.

Throughout the specification and claims, percentages and ratios are by weight; temperatures are in degrees Celsius and pressures are in KPa over ambient unless otherwise indicated. The references cited herein are specifically incorporated by reference to the extent applicable.

SUMMARY OF THE INVENTION

This invention describes a high surface area polymeric organic semi-conductor obtained from the group consisting of pyrrole and copolymers of pyrrole and mixtures thereof.

A further aspect of the invention is a polymeric organic semi-conductor obtained from the group consisting of pyrrole and a copolymer of pyrrole and mixtures thereof having a surface area greater than 25 square meters per gram.

An additional aspect of the invention is a catalytic composition comprising a polymer of pyrrole or a copolymer of pyrrole and mixtures thereof obtained by treating pyrrole or a co-polymerizable mixture containing a pyrrole at an electronically conductive surface in an electrolytic bath comprising the steps of:

(A) immersing an electronically conductive surface in an electrolytic bath comprising at least one liquid and at least one non-miscible liquid or gas or finely divided solid particles wherein a pyrrole or co-polymerizable mixture containing a pyrrole is one of the liquids or is dissolved in at least one of the liquids, and (B) passing an electric current through said bath at a voltage sufficient to electropolymerize the pyrrole or co-polymerizable mixture containing a pyrrole at the electronically conductive surface thereby obtaining the polymer of pyrrole or copolymer of pyrrole, (C) treating the polymer of pyrrole or co-polymer of pyrrole in the presence of a strong base to substantially increase the surface area of the polymer of pyrrole or copolymer of pyrrole, and (D) introducing to the high surface area polymer of pyrrole or copolymer of pyrrole a catalytic active material.

Also described herein is a process for preparing a catalytic composition comprising a polymer of pyrrole or a copolymer of pyrrole and mixtures thereof obtained by treating a pyrrole or a copolymerizable mixture containing a pyrrole at an electronically conductive surface in an electrolytic bath comprising the steps of:

(A) immersing an electronically conductive surface in an electrolytic bath comprising at least one liquid and at least one non-miscible liquid or gas or finely divided solid particles wherein a pyrrole or co-polymerizable mixture containing a pyrrole is one of the liquids or is dissolved in at least one of the liquids, and (B) passing an electric current through said bath at a voltage sufficient to electropolymerize the pyrrole or co-polymerizable mixture containing a pyrrole at the electronically conductive surface thereby obtaining the polymer of pyrrole or a co-polymer of pyrrole, (C) treating the polymer of pyrrole or co-polymer of pyrrole in the presence of a strong base to substantially increase the surface area of the polymer of pyrrole or copolymer of pyrrole, and (D) introducing to the high surface area polymer of pyrrole or copolymer of pyrrole a catalytic active material, thereby forming the catalytic composition.

Yet a further embodiment is a process for preparing a catalytic composition comprising a polymer of pyrrole or a copolymer of pyrrole and mixtures thereof obtained by treating a pyrrole or a copolymerizable mixture comprising the steps of:

(a) obtaining a pyrrole or a copolymerizable mixture containing a pyrrole;

(b) introducing to the pyrrole or copolymerizable mixture containing a pyrrole a peroxide;

(c) reacting the mixture of the pyrrole or co-polymerizable mixture containing a pyrrole and the peroxide for a sufficient amount of time to polymerize the pyrrole or the copolymerizable mixture containing a pyrrole, (d) treating the polymer of pyrrole or copolymer of pyrrole in the presence of a strong base to substantially increase the surface area of the polymer of pyrrole or copolymer of pyrrole, and (e) introducing to the high surface area polymer of pyrrole or copolymer of pyrrole a catalytic active material, thereby forming the catalytic composition.

DETAILED DESCRIPTION OF THE INVENTION

This invention, as previously noted, describes high surface area polymers of pyrrole or copolymers of pyrrole which are useful as catalysts support The term "pyrrole" as used herein describes a material of the formula given below:

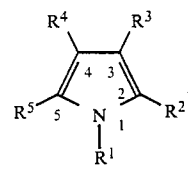

(A)

In the drawing above, $R^1$, $R^3$, and $R^4$ are all independently hydrogen or hydrocarbyl and $R^2$ and $R^5$ are always hydrogen. If $R^1$ is other than hydrogen, then a copolymerizable material containing hydrogen at the 1-position must also be employed.

The term "pyrrole" thus includes materials which may be substituted at the three and/or four positions on the pyrrole molecule. A preferred material for use herein is the unsubstituted pyrrole, that is, the compound containing only carbon, nitrogen and hydrogen atoms. Copolymers of pyrrole include any material which may be condensed with pyrrole through the two positions which are alpha to the nitrogen atom in the pyrrole molecule thereby giving a structure favoring electron distribution throughout the molecule. Shown as compound (B) below is a repeating polymeric unit formed from pyrrole.

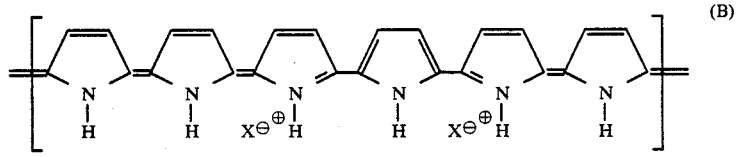
(B)

In B, and C, infra, the value $X^-$ is an anion such as the low mobility anion described herein.

Where a substituted pyrrole is intended, it is desirable that the substitution be of a non-electrophillic group. In particular, normal alkyls such as methyl, ethyl or propyl are useful. It is preferred, however, that the pyrrole be a non-substituted pyrrole. When substitution is present, it is preferred that the substitution be the beta, beta-disubstituted pyrrole.

Where copolymers of pyrrole are utilized, it is desirable that the pyrrole structure be the prominent material within the copolymer. Thus, the molar ratio ratio of the pyrrole to the copolymer should be at least 1:1, and preferably greater than 2:1. A particularly preferred material for use as a copolymer with pyrrole is thiophene as shown in formula (C).

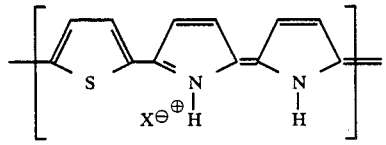
(C)

The surface area of the polymers as measured by the BET nitrogen method. The polymers obtained herein after deprotonation and prior to being loaded with the catalyst should have a surface area greater than 20 square meters per gram, preferably greater than 25 square meters per gram and most preferably greater than 50 square meters per gram. The upper limit on the surface area of the polymers is not particularly important other than that the polymer should not be so high in surface area as to be a fine powder which can not support the catalyst. Even this problem may be solved by providing the finely powdered polymer with an additional catalyst support such that the polymer of pyrrole or copolymer of pyrrole is merely retaining the catalyst while another support material retains the polymer of pyrrole or copolymer of pyrrole.

Thus, the desirable effective range for the polymer of pyrrole or copolymer of pyrrole will be from about 20 square meters per gram to about 1000 square meters per gram, preferably from about 50 square meters per gram to 750 square-meters per gram.

There are two main methods of obtaining the polymer of pyrrole or copolymer of pyrrole of the present invention having a sufficient area to function as a catalyst support. These two methods are the preparation of the polymer by electrodeposition or through chemical means, e.g., a peroxide system. The polymers are then treated with base to increase the surface area of the polymer to the necessary degree.

An alternative method of preparing the pyrrole for use in the present invention is the use of a free radical mechanism to obtain the polypyrrole or copolymer of pyrrole. For instance, a material such as potassium persulfate ($K_2S_2O_8$) is used to generate a free radical of potassium persulfate. Other similar peroxygen systems may be used to polymerize the pyrrole. The persulfate is conveniently employed at a level of about 3 moles to 1 mole of the pyrrole. The reaction temperature for obtaining the pyrrole or co-polymer of pyrrole through the peroxygen method is at about 10° C. to about 50° C., preferably about 15° C. to about 30° C.

The peroxygen produced polymer of pyrrole or co-polymer of pyrrole is quite similar to the electrochemically produced polymer of pyrrole or co-polymer of pyrrole. A notable exception is that the peroxygen produced material gives a BET surface area, slightly greater for the polymer of pyrrole or co-polymer of pyrrole. It is further noted, however, that following deprotonation, the polymer of pyrrole or co-polymer of pyrrole obtained from the peroxygen method will not achieve as great a BET surface area as the deprotonated polymer of pyrrole or co-polymer of pyrrole obtained from the electrochemical process.

A preferred method of making the polymer of pyrrole or copolymer of pyrrole which is ultimately useful as a catalyst support is described in Bundesrepublik Deutschland Offenlegungsschrift 34 021 133 A1 dated July 26, 1984, to Gerdes et al, herein incorporated by reference. The materials of Gerdes are electrically conducting polymers of pyrrole or copolymers of pyrrole. These materials are generally obtained by electropolymerization of pyrrole or a copolymerizable mixture containing pyrrole at an electronically conductive surface in an electrolytic bath.

The method of Gerdes et al comprises the steps of: (A) immersing an electronically conductive surface in an electrolytic bath comprising at least one liquid and at least one non-miscible liquid or gas or finely divided solid particles wherein the pyrrole or the copolymerizable mixture containing a pyrrole is one of the liquids or is dissolved in at least one of the liquids, and (B) passing an electric current through said bath at a voltage sufficient to electropolymerize the pyrrole or copolymerizable mixture containing a pyrrole at the electronically conductive surface. In a preferred embodiment of this method the electrolytic bath comprises an aqueous mixture comprising pyrrole, or mixture of pyrrole and a copolymerizable monomer and water. The invention further provides for an electrochemical cell comprising polymeric electrode means, said polymeric electrode means being positive and/or negative and comprising electronically conducting polypyrrole or a co-polymer of pyrrole prepared in accordance with the foregoing method.

Further provided by Gerdes et al is a method of preparing electronically conducting polypyrrole or a co-polymer of pyrrole which comprises the steps of: (A) electropolymerizing a pyrrole or a copolymerizable mixture of a pyrrole at an electronically conductive surface in an electrolytic bath by (1) immersing an electronically conductive surface in an electrolytic bath which comprises (a) an aqueous dispersion of a pyrrole, or a mixture of said aqueous dispersion and at least one copolymerizable monomer or (b) a pyrrole or a mixture of a pyrrole and/or at least one copolymerizable monomer, water and a water-immiscible diluent, (2) agitating the bath, and (3) passing an electric current through said bath at a voltage sufficient to electropolymerize the pyrrole or pyrrole mixture and deposit the polymer or co-polymer on the electronically conductive surface, and (B) removing said polymer or co-polymer from the conductive surface. In a preferred embodiment of this method, the electrolytic bath comprises an aqueous mixture comprising pyrrole or a copolymerizable mixture of pyrrole, water, and one or more low mobility anions which are incorporated into the polypyrrole by electropolymerization and which anions are characterized by an average ionic transference number for said low mobility anions on reduction of less than about 0.1. The invention further provides for an electrochemical cell comprising polymeric electrode means, said polymeric electrode means being positive and/or negative and comprising polypyrrole or a co-polymer of pyrrole prepared in accordance with the foregoing method.

There is further described herein a method of preparing electronically conducting polypyrrole or a co-polymer of pyrrole which comprises electropolymerization of a pyrrole or a copolymerizable mixture containing a pyrrole at an electronically conductive surface in an electrolytic bath by (A) immersing an electronically conductive surface in an electrolytic bath comprising (i) a pyrrole or a mixture of a pyrrole with a copolymerizable monomer, (ii) one or more low mobility anions which are incorporated into the polypyrrole or co-polymer of pyrrole and which are characterized by an average ionic transference number for said low mobility anions during reduction of the polypyrrole or co-polymer of less than about 0.1, and (iii) an organic diluent, and (B) passing an electric current through said bath at a voltage sufficient to electropolymerize the pyrrole or copolymerizable mixture containing pyrrole at the electronically conductive surface.

The electronically conducting compositions of the invention contain at least one low mobility anion, A, which has a strong tendency to be retained in the composition on reduction. The transport of ionic charge to compensate the change oxidation state of the polymer is then carried out principally by ions of the electrolyte in which the redox process is carried out. The low mobility anions may be characterized by their ionic transference numbers. The ionic transference number is defined as the fraction of the ionic current carried by the particular anion averaged over substantially full reduction of the composition. The polymer is formed in the oxidized state (black) which is electronically conductive and can be reduced to the neutral state (yellow) which is insulating. However, for practical purposes, the reduction of thick (500 millimicron or greater) films does not proceed to completion even at very negative potentials. The material remains black in appearance and retains some electronic conductivity although above about 90% reduction its resistance may increase. In general, the low mobility anions utilized in the compositions of this invention will be characterized by an average ionic transference number for said low mobility anions during reduction of less than 0.1 and preferably less than about 0.05. A most preferred low mobility anion is one characterized by an average ionic transference number for said low mobility anions during reduction of less than 0.01.

These transference numbers may be determined by elemental analysis of the polymers before and after reduction. Thus, the transference number ($t_A$) of the low mobility anion may be defined as follows:

$$T_A = \text{delta } N_A/(N_A)_O$$

wherein $(N_A)_O$ is the number of moles of the charge compensating anion initially in the polymer (when it is in the oxidized state) and delta $N_A$ is the change in the number of moles of the anion after substantially full reduction (towards the neutral state).

The porous compositions of the invention also are characterized by an apparent density of from about 0.01 g cm$^{-3}$ up to about the bulk density of the polypyrrole or copolymer of pyrrole.

Bulk or theoretical density of the polymers is the density of continuous, pure polymer containing no voids, pores, cavities or inclusions. The bulk or theoretical density can usually be determined by flotation methods. Apparent density for less dense forms of the polymer such as the porous materials is defined from the mass of the polymer and the volume calculated from the external dimensions of the material. Since voids, cavities, etc., are included in the porous-type materials, their apparent density will be lower than the bulk density.

The porous composition of the invention also is characterized as having an electrochemically accessible surface area of at least two times the surface area of a smooth film of bulk density of the polymer or co-polymer. Preferred materials have significantly greater surface areas, (e.g., 1000 times or more than that of a smooth film of bulk density).

The electronically conducting compositions of the present invention comprise either polypyrrole(s) or co-polymer(s) of pyrrole which may be obtained by (a) polymerizing mixtures of a pyrrole with other co-polymerizable monomers or by (b) grafting a co-monomer(s) to a polypyrrole polymer or by (c) grafting a pyrrole monomer(s) to a preformed polymer based on a monomer other than pyrrole.

The pyrrole monomers which can be electropolymerized may be pyrrole or substituted pyrroles such as the C-substituted pyrroles as described more fully below. Homopolymers of these pyrroles, and preferably the homopolymers of unsubstituted pyrrole are included.

Co-polymers of a pyrrole can be prepared, for example, by polymerizing a mixture of pyrrole and one or more substituted pyrroles which may be substituted either on the nitrogen atom or at one or more of the ring carbon atoms in the beta position. Preferably, the substituent is a lower alkyl group containing from 1 to 7 carbon atoms, and it is more preferably a methyl group. Thus, for example, co-polymers of pyrrole and N-methylpyrrole or 3,4-dimethyl pyrrole can be prepared in accordance with the methods of the invention. Alternatively, pyrrole can be co-polymerized with other heterocyclic ring compounds including those containing nitrogen (e.g., pyridine, aniline, indole, etc.), furan and thiophene or with other aromatic or substituted aromatic compounds. It is necessary that the polymer not consist entirely of an N-substituted pyrrole as the homopolymers are not capable of being deprotonated.

The low mobility anions which are incorporated into the compositions of the invention may be either organic or inorganic anions. Examples of low mobility inorganic anions useful in the present invention include transition metal complexes such as ferricyanide, nitroprusside, iron/sulfur cluster compounds such as the redox centers of the rubredoxins and the ferredoxins, boron cluster compounds, cobalt hexacyanide, other transition metal cyanide complexes, nitroprusside complexes, and other transition metal oxy complexes or sulfides or chalcogenide complexes, e.g. $WO_4^-$, $MoO_4^-$, $Mo(CN)_8^{4-}$, $Fe_4S_4C_4H_{12}^-$, $CrO_4^-$, etc.

Preferably, the low mobility anions included in the compositions of the present invention are organic anions. Examples of organic anions include those derived from organic sulfates or sulfonates, and these may be alkyl, cycloalkyl, aryl, arylalkyl or alkaryl sulfates and sulfonates. The anions which are useful in the present invention may contain more than one anionic site, i.e., more than one ionizable group per molecule, e.g. more than one sulfonic acid group per molecule. The sulfonates and sulfates useful as the low mobility anions in the compositions of the present invention may be represented by the following formulas:

| | |
|---|---|
| $R^1(SO_3)^{x-}$ | Formula I |
| $R^2(SO_3)^{x-}$ | Formula II |
| $R^1(OSO_3)^{x-}$ | Formula III |
| $R^2(OSO_3)^{x-}$ | Formula IV |
| $R^2_yT(SO_3)^{x-}$ | Formula V |
| $R^1_yT(SO_3)^{x-}$ | Formula VI |

In the above formulas, $R^1$ is an aliphatic or an aliphatic substituted cycloaliphatic hydrocarbon or an essentially hydrocarbon group generally free from unsaturation and usually containing up to about 30 carbon atoms although it may be polymeric and contain more than 30 carbon atoms. When $R^1$ is aliphatic, it usually contains at least about 4 carbon atoms, and when $R^1$ is alkyl substituted cycloaliphatic, the alkyl substituents preferentially contain from 1 to 4 carbon atoms. Specific examples of $R^1$ include butyl, hexyl, octyl, lauryl, cetyl, octadecyl and groups derived from petroleum, saturated and unsaturated paraffin wax, and olefin polymers including polymerized mono-olefins and diolefins containing from 2 to about 8 carbon atoms per olefinic monomer unit. $R^1$ can also contain other substituents such as phenyl, cycloalkyl, hydroxy, mercapto, halo, nitro, amino, lower alkoxy, lower alkyl-mercapto, carbalkoxy, oxo or thio, or interrupting groups such as —NH—, —O—, —S—, but preferably its overall hydrocarbon character is retained.

$R^2$ generally is a hydrocarbon or essentially hydrocarbon group containing from 1 to about 30 carbon atoms, although it may be polymeric and contain more than 30 carbon atoms. $R^2$ is preferably an aliphatic hydrocarbon group such as alkyl, alkenyl, or alkylaryl. $R^2$ also may contain substituents such as those enumerated above, including the above indicated interrupting groups, provided the essentially hydrocarbon character thereof is retained.

The group T in the above formulas V and VI is a cyclic nucleus which may be derived from an aromatic hydrocarbon such as benzene or from a heterocyclic compound such as pyridine. Ordinarily, T is an aromatic hydrocarbon nucleus and especially benzene. The subscript and superscript x represents the average number of ionized groups per molecule, The anion may contain additional sulfate or sulfonate groups which are not ionized but associated with some cationic species. In Formulas I through VI, x may have a value of up to 1000 or more when $R^1$ or $R^1$ is polymeric, but is preferably from 1 to 10, more preferably from 1 to 6, and generally is 1. The subscript y in Formulas V and VI is a number ranging from 1 to 5 and preferably is 1.

Anionic compounds containing the anions represented above by Formulas I through VI are available commercially or can be prepared readily by techniques known in the art. Examples are salts with alkali or alkaline earth metals, or ammonium salts.

Examples of sulfonates useful in the invention include the anions of the following acids; hexyl sulfonic acid, octyl sulfonic acid, dodecyl sulfonic acid, octyldecyl sulfonic acid, lauryl sulfonic acid, mahogany sulfonic acid, paraffin wax sulfonic acid, benzene sulfonic acid, napthalene sulfonic acid, lauryl cyclohexyl sulfonic acid, dodecyl benzene sulfonic acid; polyethylene sulfonic acids of various molecular weights; polystyrene sulfonic acids of various molecular weights, etc. Styrene maleic anhydride co-polymers bearing sulfonate groups on the rings or styrene maleic anhydride co-polymers which have been partially or fully converted to the corresponding imide sulfonates are also useful anionic species in the invention; such materials are derived from styrene maleic anhydride co-polymers typically having inherent viscosity of about 0.06 to about 1, preferably about 0.06 to about 0.3 dl g$^{-1}$ measured at 30° C. in acetone, 0.4—1 g dl$^{-1}$.

A preferred embodiment includes anions derived from aliphatic compounds containing two sulfonic acid groups and may be represented by the formula

$(CH_2)_n(SO_3)_2^{2-}$   Formula VII wherein n is an integer from about 2 to 20 or more and preferably about 2 to 12. These disulfonic acid salts can be prepared by techniques known in the art such as by the reaction of alkylene dihalides with sodium sulfite. Specific examples of such compounds include the salts of ethane disulfonic acid, 1,4-butane disulfonic acid, 1,5-pentane disulfonic acid, 1,6- hexane disulfonic acid, 1,8-octane disulfonic acid and 1,10-decane disulfonic acid.

Examples of sulfates which are useful include alkyl sulfates such as lauryl sulfate; and polyethylene sulfates of various molecular weights.

Another class of sulfates which are useful as the low mobility anions in the compositions of the present invention are polysulfates polyhydroxy compounds. Such compounds can be obtained by reacting polyhydroxy compounds with an appropriate reagent such as chlorosulfonic acid thereby converting one or more of the hydroxy groups to sulfate groups. Examples of polyhydroxy compounds which can be used to prepare such polysulfates include pentaerythritol, mannitol, trimethylolpropane, dipentaerythritol, etc. As mentioned, one or more of the hydroxy groups in these polyhydroxy compounds can be sulfated to produce a variety of products. Ammonium sulfates can be prepared directly from polyhydroxy compounds by reaction with an aminosulfonic acid in the presence of a diluent such as dimethyl formamide.

Amido, and preferably acrylamido alkane sulfonic acid anions can be used in the compositions of the invention. Specific examples of such anions include: 2,2- bisacrylamido-1,1,-dimethylethanesulfonic acid anion; 2-acrylamido-2-methyl propane sulfonic acid anion; and poly(2-acrylamido-2-methyl propane sulfonic acid sodium salt of various molecular weights.

The low mobility anions included in the compositions of the present invention may also be derived from pentavalent phosphorous compounds. Examples of such phosphorous compounds are phosphates, phosphonates and phosphinates. The phosphorous compounds useful as the low mobility anions in the compositions of the present invention may be represented by the following formulas:

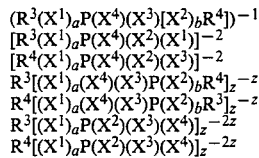

| | |
|---|---|
| $(R^3(X^1)_aP(X^4)(X^3)[X^2)_bR^4])^{-1}$ | Formula VIII |
| $[R^3(X^1)_aP(X^4)(X^2)(X^1)]^{-2}$ | Formula IX |
| $[R^4(X^1)_aP(X^4)(X^2)(X^3)]^{-2}$ | Formula X |
| $R^3[(X^1)_a(X^4)(X^3)P(X^2)_bR^4]_z^{-z}$ | Formula XI |
| $R^4[(X^1)_a(X^4)(X^3)P(X^2)_bR^3]_z^{-z}$ | Formula XII |
| $R^3[(X^1)_aP(X^2)(X^3)(X^4)]_z^{-2z}$ | Formula XIII |
| $R^4[(X^1)_aP(X^2)(X^3)(X^4)]_z^{-2z}$ | Formula XIV |

In the above formulas $R^3$ is $R^1$ or $R^1yT$ as defined above, or can be hydrogen, an alkali metal (e.g., lithium, sodium, potassium, etc.) or an alkaline-earth metal (e.g., calcium, magnesium, etc.). $R^4$ is $R^2$ or $R^2yT$, as defined above, or can be hydrogen, an alkali metal (e.g., lithium, sodium, potassium, etc.) or an alkaline earth metal (e.g., calcium, magnesium, etc.). Each of $X^1$, $X^2$, $X^3$ and $X^4$ is oxygen or sulfur (e.g., a phosphorus double bond); and each a and b is 0 or 1. The subscript and superscript z represents the average number of ionized groups per molecule. In Formulas XI through XIV, z may be a value of up to 1000 or more when $R^1$ or $R^2$ is polymeric, but is preferably from 1 to 10, more preferably from 1 to 4, and generally is 1. Thus, it will be appreciated that the pentavalent phosphorous compounds may be for example, organophosphoric, phosphonic or phosphinic compounds including the acids, alkali metal salts and alkaline-earth metal salts thereof, or a thio analog of any of these.

Although useful electronically conducting compositions can be prepared in accordance with the method of the invention comprising a polypyrrole or a co-polymer of a pyrrole, and a low mobility anion as described above, the properties of the compositions may be improved by the inclusion of other components which provide certain desirable properties. The electrolytic baths useful in the formation of the compositions of this invention preferably will contain a plasticizer. Plasticizers are compounds known in the art which have the ability when incorporated into polymeric compounds such as polypyrrole or co-polymers of a pyrrole to increase stretch elongation and/or decrease the modulus of the polymer and/or increase flexibility. The last criterion has been used to define the term plasticizer as applied to the materials in this application. Compounds which can increase the flexibility of the compositions of the invention generally are included in the electrolytic baths. In some instances, the low mobility anions which are incorporated into the compositions of the invention have more than one function and may, for example, include the fuction of a plasticizer and/or a surface active agent in the composition. For example, many of the higher molecular weight sulfates or sulfonates listed above as low mobility anions, also function as plasticizers and, additionally, can modify the wetting properties of the polymer. A specific example is sodium lauryl sulfate which functions as a low mobility anion and as a plasticizer for polypyrrole and copolymers of pyrrole.

The plasticizers which are useful in the present invention include organic sulfates or sulfonates such as alkyl, aryl, arylalkyl, alkaryl and polyolefin sulfates or sulfonates of the types listed above as low mobility anions. Another class of compounds useful as plasticizers and the compositions of the present invention are polyhydroxy compounds.

The polyhydroxy compounds are preferably those containing from 2 to 6 alcoholic radicals of which at least 1 is unsubstituted. The unsubstituted polyhydric alcohols include ethylene glycol, 1,2-propylene glycol, 1,3-propylene glycol, glycerol, erythritol, pentaerythritol, arabitol, adonitol, xylitol, mannitol, sorbitol, and neopentylglycol. Higher molecular weight polyhydric alcohols include various polyethylene glycols, and polypropylene glycol.

Partially acylated polyhydric alcohols likewise are contemplated for use herein. The partially acylated polyhydric alcohols are preferably those containing from 2 to 6 alcoholic radicals of which at least one but not all are acylated with an aliphatic carboxylic acid having from about 8 to about 30 carbon atoms. Examples are glycerol mono-oleate, glycerol di-stearate, sorbitan mono-stearate, sorbitan di-decanoate, sorbitan tristearate, sorbitan di-behenate, erythritol mono-oleate, 1,1,1-trimethylol propane mono-myristate, pentaerythritol di-linoleate, ribitol mono-(9,10-dichloro stearate), sorbitan monooleate, etc.

The polyhydric alcohols may also contain ether linkages within their molecular structure. The ether-containing polyhydric alchohols may be obtained by dehydrating a polyhydric alcohol. Examples of such derivatives are sorbitan and mannitan. The ether-containing polyhydric alcohols may also be obtained by reacting a polyhydric alcohol with an epoxide. The expoxides are for the most part hydrocarbon epoxides and substantially hydrocarbon epoxides. The hydrocarbon epoxide may be an alkylene oxide or an aryl-alkylene oxide. The aryl-alkylene oxides are exemplified by styrene oxide, para-ethylstyrene oxide and parachlorostyrene oxide. The alkylene oxides include principally the lower alkylene oxides such as ethylene oxide, propylene oxide, 1,2-butene oxide and 1,2-hexene oxide. The substantially hydrocarbon epoxides may contain polar substituents. The polar substituent is usually a halo radical such as chloro, fluoro, bromo, or iodo; an ether radical such as methoxy or phenoxy; or an ester radical such as carbomethoxy. Examples of such epoxides are epichlorohydrin and butyl, 9,10-epoxy-stearate. The number of ether linkages in the product is determined by the amount of epoxide added. Thus it is possible to react polyhydric alcohol such as sorbitol with 1,2,3 or more equivalents of an epoxide such as propylene oxide.

The polyhydric alcohols contemplated for use in this invention may also be ether-containing acylated polyhydric alcohols. These may be prepared by a number of methods. A polyhydric alcohol may be dehydrated and subsequently acylated or an alcoholic radical may be acylated first followed by dehydration of other alcoholic radicals. As mentioned previously, the ether linkage may also be introduced by the reaction of an epoxide with the polyhydric alcohol either before or after acylation. Examples of ether-containing acylated polyhydric alcohols include polyoxyethylene sorbitan mono-oleate, polyoxyethylene sorbitan tri-stearate, polyoxyethylene glycerol di-stearate, polyoxypropylene sorbitan di-linoleate, and polyoxypropylene pentaerythritol mono-oleate.

A particularly preferred example of a class of plasticizers useful in the compositions of the invention are polyalkylene polyols, polyethers and polyglycerols, and particularly polyalkylene glycols wherein the monomer unit may contain from 1 to about 4 carbon atoms and preferably about 2 carbon atoms. A specific example is polyethylene glycol. The molecular weight of the plasticizers may vary over a wide range depending upon the composition to be modified and the properties which are to be modified by inclusion of the plasticizer. Polyethylene glycols of molecular weight of from about 300 to about 5,000,000 are included in the electrolytic bath composition and are useful in modifying the properties of the compositions of the present invention.

It also has been discovered that when the electropolymerization of pyrrole or polymerizable mixtures of pyrrole is carried out using either an aqueous medium or a multi-phase system as described below, the presence of polyethylene glycol over a range of molecular weights confers mechanical strength and flexibility to the polymeric compositions obtained. Moreover, when polyethylene glycol of various molecular weights is added to electrolytic baths of the invention, the morphology of the polymeric composition obtained generally can be modified by varying the molecular weight of the glycol added.

The amount of plasticizer included in the electrolytic bath of the invention may vary over a wide range, particularly if the low mobility anion also fuctions as a plasticizer. Generally, however, the electrolytic bath compositions of the invention will contain less than about 75% of plasticizer and preferably, less than about 25% by weight of the plasticizer based on the total weight of the bath composition.

Surface active agents, also variously referred to as wetting agents or emulsifying agents, may be included in the compositions of the invention and in the electrolytic baths utilized to form the compositions of the invention.

The surface active agent may be hydrophilic or hydrophobic. Typically, the surfactant is a hydrophilic surfactant, and generally, has an HLB (hydrophilic-lipophilic balance) in the range of about 10 to about 20.

The surfactant can be of the cationic, anionic, non-ionic or amphoteric type. Many such surfactants of each type are known to the art. See, for example, McCutcheon's "Detergents and Emulsifiers", 1978, North American Edition, published by McCutcheon's Division, MC Publishing Corporation, Glen Rock, N.J., U.S.A., particularly pages 17-33 which are hereby incorporated by reference for their disclosures in this regard.

Anionic surfactants contain negatively charged polar groups while cationic surfactants contain positively charged polar groups. Amphoteric surfactants contain both types of polar groups in the same molecule. A general survey of useful surfactants is found in Kirk-Othmer Encyclopedia of Chemical Technology, Second Edition, Volume 19, page 507 and following (1969, John Wiley and Son, New York) and the aforementioned compilation published under the name of McCutcheon's. These references are both hereby incorporated by reference for their disclosures relating to cationic, amphoteric and anionic surfactants. The anionic or non-ionic surfactants are preferred. The low mobility anion incorporated into the polymer may additionally perform the function of a surface active agent.

Among the useful anionic surfactant types are the widely known metal carboxylate soaps, organo sulfates, sulfonates, sulfocarboxylic acids and their salts, and phosphates. Useful cationic surfactants include nitrogen compounds such as amine oxides and the well known quaternary ammonium salts. Amphoteric surfactants include amino acid type materials and similar types. Various cationic, anionic and amphoteric dispersants are available from the industry particularly from such companies as Rohm and Haas and Union Carbide Corporation. Among the non-ionic surfactants are the alkylene oxide-treated products, such as ethylene oxide-treated phenols, alcohols, esters, amines and amides. Ethylene oxide/propylene oxide block co-polymers are also useful non-ionic surfactants. Glycerol esters and sugar esters are also known to be non-ionic surfactants. A typical non-ionic surfactant class useful with the derivatives of the present invention are the alkylene oxide-treated alkyl phenols such as the ethylene oxide alkyl phenol condensates sold by the Rohm & Haas Company. A specific example of these is Triton X-100 which contains an average of 9-10 ethylene oxide units per molecule, has an HLB value of about 13.5 and a molecular weight of about 628. Many other suitable non-ionic surfactants are known; see, for example, the aforementioned McCutcheon's as well as the treatise "Non-ionic Surfactants" edited by Martin J. Schick, M. Drekker Co., New York, 1967, which is hereby incorporated by reference for its disclosures in this regard.

Further information about anionic and cationic surfactants also can be found in the texts "Anionic Surfactants", Parts II and III, edited by W. M. Linfield, published by Marcel Dekker, Inc., New York, 1976, and "Cationic Surfactants", edited by E. Jungermann, Marcel Dekker, Inc., New York, 1976. Both of these references are incorporated by reference for their disclosures in this regard.

The electronically conducting polypyrrole or co-polymers of pyrrole of the present invention are prepared by electropolymerization of a pyrrole or a co-polymerizable mixture containing a pyrrole at an electronically conductive surface in an electrolytic bath. The electrolytic bath contains a pyrrole or mixture of pyrrole and co-polymerizable monomer, at least one electrolyte salt which includes an anion which will be incorporated into polymer upon formation and at least one liquid in which the pyrrole (and/or co-polymer) and electrolyte salt together have some finite solubility. The bath may additionally contain a second non-miscible liquid or a gas or finely divided solid particles or combinations thereof. In one embodiment, the electrolytic bath comprises a pyrrole or co-polymerizable mixture of pyrrole and water. In another embodiment, the electrolytic bath comprises the pyrrole or co-polymerizable mixture of pyrrole and an organic diluent. In yet another embodiment, the electrolytic bath comprises the pyrrole or co-polymerizable mixture containing pyrrole, water, and a non-miscible liquid such as an organic diluent. The last embodiment wherein the bath contains water and a non-miscible organic diluent, hereinafter referred to as the two-phase system, is useful in preparing compositions of the invention which may be characterized as being porous and having very high surface areas.

The electropolymerization of a pyrrole or a co-polymerizable mixture containing a pyrrole utilizing a two-phase system such as water and an organic diluent comprises the steps of A. immersing an electronically conductive surface in an electrolytic bath comprising at least one liquid and at least one non-miscible liquid wherein the pyrrole or co-polymerizable mixture is one of the liquids or is dissolved in at least one of the liquids and B. passing an electric current through said bath at a voltage sufficient to electropolymerize the pyrrole or co-polymerizable mixture containing a pyrrole at the electronically conductive surface. Preferably, one of the liquids is water and the non-miscible liquid is an organic diluent. Examples of organic diluents useful in the present invention include organic hydrocarbons such as aliphatic or aromatic hydrocarbons, halogenated aliphatic or aromatic compounds, etc. specific examples include mineral spirits, hexane, heptane, toluene, xylene, 1,2-dichloroethane, dichloromethane, carbon tetrachloride, and chlorobenzene.

The amount of the pyrrole or co-polymerizable mixture containing pyrrole in the electrolytic bath may vary over a wide range although the total amount must exceed the amount necessary to form the total amount of polymer desired. The amount of the pyrrole dissolved in the electrolyte solution component(s) of the electrolytic bath must be enough to permit a reasonable rate of reaction. The amount will usually vary from about $10^{-3}$ molar up to saturation of the electrolyte(s). The amount of electrolyte salt in the electrolytic bath must be sufficient to both conduct the current desired and provide sufficient anionic species for incorporation into the polymer for the purpose of charge neutralization. Typical concentrations are from $10^{-2}$ molar up to saturation of the bath, and more typically $5 \times 10^{-2}$ up to 1 molar in at least one phase.

As mentioned above, the electrolytic bath of the invention may contain other ingredients which provide desirable properties to the compositions of the invention. Thus, the bath may contain low mobility anions, plasticizers, redox couples, surfactants, etc., as defined above. When an aqueous system or a multi-phase system containing water is utilized for the electrolytic bath, an emulsifier or emulsion stabilizer may be included to stabilize this system.

The electronically conducting compositions contain at least one low mobility anion, A, which has a strong tendency to be retained in the composition on reduction.

Also useful herein are emulsion stabilizers such as the neutral alkali metal salts of fatty acids having at least 12 aliphatic carbon atoms in the fatty radical. These fatty acids include, principally, lauric acid, stearic acid, oleic acid, myristic acid, palmitic acid, linoleic acid, linolenic acid, behenic acid, or a mixture of such acids such as are obtained from the hydrolysis of tall oil, sperm oil, and other commercial fats.

Only a small amount of the stabilizer is necessary for the purpose. It may be as little as 0.01 part and seldom exceeds 2 parts per 100 parts by weight of the electrolytic bath. In most instances it is within the range from 0.1 to 3 part per 100 parts of the bath.

As mentioned, the electropolymerization process utilized in this invention can be carried out in an organic diluent and more particularly in an organic phase containing less than about 3% and more preferably less than about 1% of water. Examples of organic diluents include polyols, organic carbonates, ethers, nitriles, etc. It is essential that the solvent does not undergo competitive oxidation during the electropolymerization and thus interfere with the polymerization or substantially reduce the current efficiency of the polymerization process.

The electropolymerization of pyrroles from aqueous media, by either a single-phase aqueous system or a multi-phase aqueous system is possible. Many of the advantages of using aqueous systems are apparent including, reduced costs, availability and easy purification of water, the ability to utilize a wide range of ionic materials as electrolyte salts in water, the ability to utilize high concentrations of ionic species thus permitting high electrochemical currents and high polymer formation rates. Under controlled conditions, intact homogeneous films of polypyrroles can be formed on a variety of substrates in aqueous media. Thicknesses range from less than 100 Angstroms to a few millimeters for more dense materials. In some instances, current density has an effect on the morphology. The morphology of the electropolymerized compositions of the invention can be further modified by the use of the additives already discussed.

It has been observed that improved results are obtained when the electroplating bath is thoroughly agitated during the electropolymerization of the monomers. Agitation can be accomplished by any known technique including vigorous stirring with paddle mixers, magnetic stirrers, ultrasonics, vibration or by bubbling gases through the bath to provide sufficient agitation (including gases generated at the counter-electrode). Electropolymerization is accomplished by passing an electric current through the bath at a voltage which is sufficient to electropolymerize the pyrrole or co-polymerizable mixture containing a pyrrole at an electronically conductive surface immersed in the electrolytic bath. The electric current may be a continuous electric current or a varying electric current such as a pulse current. Generally, the electric current is direct current although in some instances alternating current may be useful.

The voltage at the anode should be sufficient to oxidize monomer without producing significant changes in the bath, such as degradation of a bath component, which would adversly affect the polymerization. Generally, current densities of up to two amperes per square centimeter may be used, but preferably, current densities not exceeding 500 milliamperes per square centimeter are utilized. The current density will be less than 250 and more generally, less than 100 milliamps per square centimeter.

At the above current densities, the pyrrole or copolymerizable mixture of a pyrrole is electropolymerized at the electronically conductive surface. Depending upon the specific ingredients in the plating bath, the electropolymerizable polypyrrole may either form as a powder at the electronically conductive surface and fall into and be dispersed in the electrolytic bath, or alternatively, be deposited on the conductive surface. The deposit may be in the form of a film which is either smooth and dense or irregular with less than the bulk or theoretical density. Bulk or theoretical density of the polymers is the density of continuous, pure polymer containing no voids, pores, cavities or inclusions. The bulk or theoretical density can usually be determined by floatation methods. Examples of irregular deposits include porous films, powders, dendriform materials, etc. The nature of the cation(s) as well as that of the anion(s) present in the electrolytic bath affects the electropolymerization. The morphology of the deposit on the electronically conductive substrate can be controlled and modified by the incorporation in the electrolytic bath of various complexing agents for the ionic constituents of the electrolyte. Examples of materials which function as growth regulators when incorporated into the electrolytic bath include the above-discussed non-ionic plasticizers (e.g. polyalkylene glycol such as polyethylene glycol), cryptands, and commercially available crown ethers such as 12-Crown-4, 15-Crown-5, and 18-Crown-6 available from Aldrich Chemical Co.

The temperature of the electrolytic bath during the electropolymerization process is generally maintained between about 15° C. to about 50° C., although polymerization proceeds over a much wider temperature range. The reaction is conducted at or about room temperature and preferably under thermostatted conditions.

A variety of electronically conductive substrates that do not undergo competitive oxidation during the electropolymerization can be utilized in the process of the invention. Not all types of metals can be used with the entire range of bath formulations. For example, although steel surfaces are useful for electropolymerizing pyrrole in the presence of sodium lauryl sulfate and water, the electrolytic bath containing pentaerythrityl tetrasulfate and water will not deposit a satisfactory film on steel, but deposits a satisfactory coating on nickel substrates. The choice of particular substrate material can be readily determined by those skilled in the art, with a minimum of experimentation. The size and shape of the substrate utilized in the process of the invention will vary depending upon the type of cell in which the electropolymerization process is conducted and on the desired form of the polymer. For example, when flat films are desired, the substrate will be in shape of a flat panel in a parallel plate cell.

A preferred embodiment provides for a rotating cylindrical anode or a moving belt anode from which the polymer is removed in a continuous process. The polymer can also be collected or stripped from a stationary electrode in a continuous manner.

The time required to produce a given quantity or thickness of polymer will depend upon several factors, including the current density, bath temperature, size or physical dimensions of the electronically conductive surface and the temperature of the electrolytic bath. Moreover, the specific type of morphology desired will be an important consideration when selecting the values of the process variables such as temperature, current density, time of coating, voltage, etc.

One of the advantages of the process, particularly with the aqueous systems, is the ability to produce films of controlled thickness over a wide range of thicknesses, and in particular, films having thicknesses greater than 250 micrometers, and in particular, thicknesses between a range of 0.5 mm. to 2 cm. Many prior art processes have not been developed to the level required to produce anything but thin films (200 micrometers or less).

In the general process of the invention, the electronically conductive surfaces are introduced into the electrolytic bath and connected to a current source. The polymer is formed at the anode. The counterelectrode may consist of the bath tank or a separate conductive surface(s) may be introduced into the electrolytic bath. The bath may have a separate compartment for the secondary electrode but the one compartment configuration is preferred.

When the electropolymerization process is completed, the substrate is removed from the electrolytic bath, and the electropolymerized material is mechanically stripped from the surface. This polymer may be washed with water and with various non-aqueous solvents (e.g., ethers, liquid hydrocarbons, etc.) to remove any undesirable deposits contained on or in the material. If the deposited material has not been fully dried, this can be achieved, if desired, by heating the polymer at elevated temperatures, preferably under vacuum. The particular temperatures will depend upon the nature of the pyrrole or co-polymerizable mixture of pyrroles utilized in the process, but will generally be less than 250° C. and preferably below 100° C.

The following examples illustrate the process of obtaining the polymer of pyrrole or copolymers of pyrrole:

Unless otherwise indicated, in the following examples, electropolymerizations are conducted at 2 amperes for 30 minutes using a Hanovia arc-lamp power supply controlled with a Variac. Agitation is accomplished with a horizonal perforated glass disk mounted on the bottom of a stirring rod (about 1 to 2 cm from the bottom of the bath) and rapidly vibrated up and down with a Vibro-Mixer (Model El, supplied by A.G. Fur Chemie-Apparatebau Mannedorf-Zurich). The temperature is controlled with ah ice bath. Both electrodes are 15×7.5×0.05 cm panels of steel (AISI No. 10/10) in parallel plate configuration that have been degreased with toluene. The surface area (one side) of each electrode immersed in the bath is 70 cm² and the distance between the electrodes is 5.5 cm. The polyethylene glycol used in some of the examples has an average molecular weight of about 15-20,000. The bath is exposed to the atmosphere. The descriptions of the polymer films of the following examples do not cover edge effects. These effects produce irregularities which rarely affect more than five percent of the total mass of the film.

EXAMPLE 1

In this example, the following components are utilized:

|  | Grams |
| --- | --- |
| Pyrrole | 40 |
| Sodium Lauryl Sulfate | 40 |
| Polyethylene Glycol | 20 |
| Distilled Water | 1600 |
| Heptane | 200(ml.) |

The above first four ingredients are mixed in a container until homogeneous, and 375 ml. of this mixture is added to the 10.8×8.9×5.7 cm. reaction vessel. Two steel panel electrodes are put into place. Heptane (50 ml.) is added, and agitation is accomplished mechanically with a Vibro Mixer.

Four films are separately prepared at 2 amperes utilizing a reaction time of 30 minutes. The temperature is controlled with an ice bath and is initially 21° C. and rises to a temperature of about 34°-37° C. during the reaction. The current is maintained at 2 amperes, but the voltage changes from about 60 to about 40 volts during the course of the reaction. The electrolyte side of each film has a few irregularities in the form of dendriform projections (about 1 millimeter) and these projections are removed by light abrasion before stripping the films from the electrode surfaces. Each film is rinsed thoroughly in distilled water and in heptane.

Two of the films are fully dried in a vacuum oven at 50° C. for 24 hours. The cleaned films obtained in this manner appear to comprise 3 layers. The first layer which is the layer closest to the steel panel is smooth and continuous. The second layer adjacent to the smooth layer is a uniformly porous material and the third layer adjacent to the second layer is denser and less porous than the second layer. The two other films obtained in this example are stripped of their backing or smooth layer and cut into ¾ inch strips. The strips are cleaned in a Soxhlet extractor with distilled water for 15 hours. After drying at room temperature, the pieces are further dried in a vacuum oven at 50° C. for 24 hours.

EXAMPLE 2

A mixture of 5 grams of pyrrole, 1 gram of sodium ethane disulfonate, 2 grams of polyethylene glycol and 200 grams of water is prepared and added to an 8×7×4.5 cm reaction vessel. The cathode is a 15×5×0.025 cm piece of Precision brand shim steel (a product of Precision identified as NIDA/SIDA 1613D Al). The anode is a 10×5×0.05 cm Nickel 200 panel. (Nickel 200 is a product of Inco identified as a high purity nickel.) The surface area (one side) of each electrode immersed in the bath is about 40 $cm^2$. Toluene (20 ml.) is added and the mixture agitated using a Vibro-Mixer. The electropolymerization reaction is conducted for 15 minutes at a constant current of 0.5 amperes at a potential of about 17 volts. The film formed on the electrode is removed and observed to be a relatively porous uniform film of about 0.3 to 0.4 mm in thickness.

EXAMPLE 3

A mixture of 20 grams of pyrrole, 4 grams of pentaerythrityl tetrahydrogensulfate, 4 grams of polyethylene glycol and 800 grams of water is prepared and mixed until homogeneous. A volume of 375 ml. is added to a 5.7×8.9×10.8 cm reaction vessel, and 50 ml. of dichloromethane also is added to the vessel. In this example, a panel of steel (AISI No. 10/10) (15×7.5×0.05 cm) is used as the cathode, and a Nickel 200 sheet (14.2×7.6×0.025 cm) is used as the anode. The electropolymerization is carried out in a normal manner over a period of 15 minutes while maintaining a current of 2 amperes. A porous mass of approximately 1 cm in thickness with a low density (less than 0.1 g $cm^{-3}$) is obtained; this porous mass is electronically conducting.

EXAMPLE 4

A mixture of 20 grams of pyrrole, 10 grams of sodium-1,10-decane disulfonate, 10 grams of polyethylene glycol and 800 parts of water is prepared, and 375 ml. added to each of two reaction vessels. Heptane, (50 ml) is added to each reaction vessel, and the electropolymerization carried out in the normal manner at a current of 2 amperes. The electropolymerization in the first reaction vessel is terminated after 5 minutes yielding a thin black electronically conductive film covered with small dendriform projections of about 1 mm. in height.

The electropolymerization reaction in the second vessel is carried out for 39 minutes yielding a thicker base film covered with small dendriform projections of approximately the same dimensions as for the previous film.

EXAMPLE 5

A mixture of 10 grams of pyrrole., 10 grams of sodium lauryl sulfate and 0.5 grams of polyethylene glycol is prepared and added to the reaction vessel. In this example, both electrodes are steel panels and agitation is by a Vibro Mixer. The electropolymerization reaction is conducted for 20 minutes at a current of 2 amperes. A thick rather uniform coating is deposited on the anode and the coating is covered with small dendriform shapes which are easily removed by light abrasion.

EXAMPLE 6

The procedure of Example 5 is repeated except that 50 ml of heptane is added to the mixture in the reaction vessel, and the electropolymerization is conducted for five minutes at 2 amperes. The film prepared in this manner is more porous than the material obtained from the procedure of Example 5 and is covered with dendriform shapes.

EXAMPLE 7

Pentaerythrityl tetrasulfate ammonium salt is prepared from pentaerythritol and sulfanic acid in N,N,-dimethylformamide. A mixture of 5 grams of pyrrole and 5 grams of the ammonium salt in 200 ml. water is prepared and electropolymerized in a 8×7×4.5 cm reaction vessel wherein the cathode is a 15×5×0.025 cm nickel sheet. About 40 $cm^2$ of the nickel sheet is immersed in the bath. The distance between electrodes is 4.5 centimeters. Electropolymerization is conducted at a current of 0.3 amperes for a period of 10 minutes yielding a black electronically conducting film characterized by a somewhat rough surface on the solution side of the film.

EXAMPLE 8

The procedure of Example 7 is repeated except that 2 grams of polyethylene glycol is included in the mixture contained in the reaction vessel. The black electronically conducting film obtained in this manner is more uniform and smoother on the solution side than the film obtained in Example 7.

EXAMPLE 9

Mannityl hexasulfate ammonium salt is prepared from mannitol and sulfamic acid in dimethylformamide. A mixture of 5 grams of pyrrole and 1 gram of this ammonium salt is dissolved in 200 ml. of water. Utilizing the apparatus described in Example 7, the polymerization is carried out at a current of about 0.4 amperes over a period of 20 minutes. The product is a black electronically conducting film which is shiny on the substrate side and rough on the solution side.

EXAMPLE 10

The procedure of Example 9 is repeated except that 2 grams of polyethylene glycol is added to the mixture in the reaction vessel. A more uniform film is obtained in this example which is much smoother on the solution side.

EXAMPLE 11

A mixture of 15 grams of pyrrole in 500 grams of water is prepared, and a second mixture of 10 grams of potassium ferricyanide and 5 grams of polyethylene glycol is prepared in 400 ml. of water. The two solutions are mixed together and shaken. Approximately 450 ml. of the mixture is poured into the 10.8×8.9×5.7 cm reaction vessel. The electrodes used in this example are both steel panels. The electropolymerization is conducted at 5 amperes. At the start of the reaction, the temperature is 23° C. and the voltage is 22 volts. During the electropolymerization reaction, the temperature is stabilized at 31°–32° C. with an ice bath. At this temperature, 20 volts is required to maintain a current of 5 amperes. The distance between electrodes is 5.5 cm. The electropolymerization reaction is conducted for 40 minutes. The polymer is then removed from the anode. This film is 0.8 mm. thick, black and electronically conducting. The film is smooth on both sides although smoother on the substrate side.

EXAMPLE 12

The procedure of Example 11 is repeated except that the 15,000–20,000 molecular weight polyethylene glycol is replaced by an equivalent weight of Carbowax 4000 (a product of Union Carbide identified as 4,000 molecular weight polyethylene glycol). The electropolymerization reaction is conducted at 5 amperes current and about 20 volts are required to maintain this current throughout the 40 minute reaction period. The temperature of the bath ranges from 22° to 32° C. The polymer is removed from the electrode, and the film obtained in this manner is black and electronically conducting. The substrate side is smooth while the solution side is covered with dendriform structures.

EXAMPLE 13

A mixture of 2 grams of pyrrole, 0.4 grams of a 50% aqueous solution of the sodium salt of 2-acrylamido-2-methylpropanesulfonic acid and 100 ml. of water is prepared and mixed until homogeneous. In this example, the cathode of the reaction vessel is a platinum strip (0.5×3 cm.) and the anode is a gold surface (2×4 cm) with about 4 cm$^2$ immersed in the bath. The electrodes are rinsed with distilled water prior to use. The electropolymerization in this example is carried out using a Hewlett Packard power supply/amplifier Model 6824A. The electropolymerization reaction is conducted at a current of 24 milliamps and at a voltage of 15 volts for a period of 2 minutes. A thin black electronically conductive film is deposited on the gold surface.

EXAMPLE 14

The procedure of Example 13 is repeated except that the electrolyte salt utilized in poly(2-acrylamido-2-methylpropanesulfonic acid sodium salt having an inherent viscosity of 0.1 dl. g.$^{-1}$ (measured in 0.5 N NaCl at 30° C). The electropolymerization is conducted at 30 milliamps at 20 volts for a period of 2 minutes. A smooth thin glossy black electronically conducting film is deposited on the gold surface.

EXAMPLE 15

A mixture of 20 grams of pyrrole, 20 grams of sodium lauryl sulfate, 10 grams of polyethylene glycol and 800 grams of water is prepared, and 375 ml. of this mixture 800 grams of water is prepared, and 375 ml. of this mixture is added to the 10.8×8.9×5.7 cm reaction vessel. Heptane (50 ml) for each experiment is then added to the reaction vessel, and agitation is accomplished with a repidly vibrating glass disk. The temperature is controlled with an ice bath. In this example, the electropolymerization is carried out using a current of 2 amperes. The reaction time is 30 minutes and the reaction temperature ranges from 20°–38° C. The polymer formed on the anode is removed and cleaned by washing several times in distilled water. The film prepared in this manner comprises a very thin base layer next to the substrate, a uniformly porous layer adjacent the base layer and a denser wrinkled less porous layer on the electrolyte side. The polymer layer is removed from the electrode and a 4×1 cm strip is cut from the film and its thin base layer is removed. The rest of the film is broken into pieces and rinsed several times with distilled water along with the strip. The pieces and the strip are then rinsed further in a Soxhlet extractor using distilled water for 15 hours (about 40 extractions). The materials are then dried in a vacuum oven at 80° C. for 29 hours. This polymer is electronically conducting and can be ground dry to a porous powder which is easily cold pressed without any additives various shapes as desired. The shapes obtained in this manner are also electronically conducting.

EXAMPLE 16

The procedure of Example 15 is repeated except that the mixture contains only 7.5 grams of polyethylene glycol. The electropolymerization of the mixture results in a thinner, denser film than obtained in Example 15. The film also does not appear to be as flexible and the corresponding powder does not cold press as well as the powder obtained in Example 15.

EXAMPLE 17

The procedure of Example 15 is repeated except that the mixture contains only 5 grams of polyethylene glycol. The film obtained in this manner is electronically conductive, is thinner than the film obtained in Example 16 and is less uniform.

EXAMPLE 18

An electrolyte bath is prepared comprising 1 g of phenyl phosphonic acid and 2 g of pyrrole in 100 g of water. The electropolymerization is carried out in the unstirred bath on a gold strip of dimensions 3 cm×0.5 cm. The gold strip is immersed to a depth of 1 cm. A platinum counter-electrode is employed and a current of 1 milliampere is maintained for 300 seconds. The product is a black electronically conducting film.

EXAMPLE 19

A mixture of 40 grams of pyrrole, 40 grams of sodium lauryl sulfate, 15 grams of polyethylene glycol and 1,600 grams of water is agitated until homogeneous, and 1200 ml is added to a 8.25×14×19 cm plastic reaction vessel. Both electrodes are 14×19×0.1 cm panels of steel (AISI No. 10/10 steel plate degreased with toluene. Heptane (150 ml) is added and agitation is accomplished with a Vibro Mixer. The surface area of the anode covered with polymer is about 250 cm$^2$. The electropolymerization reaction is conducted for a period of one hour at a current of about 4 amperes D.C. The product is removed from the anode and partially pulverized by hand while washing with distilled water. After further washing (Soxhlet extraction with distilled water) and drying, (vacuum oven, 85° C., 20 hr.) the polymer was pulverized further with a mortar and pestal. In this manner, fine black electronically conducting powder is obtained.

The powder obtained in this example can be cold pressed at room temperature in the dry state without any additives, and the pressed electrodes obtained in this manner exhibit improved electronic conductivity over the dried electropolymerized films. The density of the electropolymerized film is about 0.2 g cm$^{-3}$ whereas the density of the pressed electrode is about 0.8 g cm$^{-3}$.

EXAMPLE 20

The procedure of Example 19 is repeated except that the power source is a simple full wave rectifier (12 amp rating) controlled with a Variac. The voltage requirements are essentially identical to those of Example 19.

The electronically conductive polymers of co-polymers prepared above are useful, for example, for electrodes in electrochemical cells (e.g., as electrodes in batteries, both primary and secondary batteries); as coatings for photocells to inhibit photo-corrosion or corrosion processes; for catalytic electrodes; for electric conductors; for conductive substrates and/or binders and mixtures for composite electrodes; for switching devices; and as durable or corrosion resistant electropolymerized coatings. The electronically conductive polymers are also useful in solid state applications (e.g., in the formation of junctions) and/or for photovoltaic and photoelectrochemical devices and as reversible electrode materials in electrochemical cells and batteries.

The polymer of pyrrole or copolymer of pyrrole when obtained from electrodeposition is conveniently removed from the electrode by scraping or mild agitation. Where the free radical method is used to generate the polymer of pyrrole or copolymer of pyrrole, the mixture may be stripped of excess solvent, reactant and other materials and thereafter treated with the strong base in order to substantially increase the surface area. Of course, where the electrochemical method is utilized, the scraped material may be washed, otherwise prepared and thereafter treated in a suitable solvent with the strong base to remove the counter anion thereby substantially increasing the surface area.

The next aspect of the present invention discusses the deprotonation of the polymer of pyrrole or co-polymer of pyrrole. It will be observed that when using the electrochemical method, an anion of an organic material, typically, a lauryl sulfate anion will be associated with the polymer of pyrrole or co-polymer of pyrrole. When the peroxygen method is employed, an anion such as KSO$_4^-$ is intimately associated with the polymer of pyrrole or co-polymer of pyrrole.

It has been determined that the anion associated with the polymer of pyrrole or co-polymer of pyrrole may be removed utilizing a strong base. By a strong base, it is intended to exclude such weak materials which cannot effectively remove substantially all of the anion associated with the polymer of pyrrole or co-polymer of pyrrole. Suitable materials which may be utilized to remove the anion include materials such as the alkali metal and alkaline earth metal hydroxides, the alkali metal and alkaline earth metal alkoxides, and various amine bases. The alkali metal hydroxide of choice is sodium hydroxide. However, potassium hydroxide, lithium hydroxide or even cesium hydroxide may be utilized to remove the anion from the polymer of pyrrole or co-polymer of pyrrole. Among the alkaline earth metal hydroxide which may be utilized, it is suggested that calcium hydroxide is most convenient from a cost effective standpoint. However, material such as magnesium hydroxide may also be utilized effectively to remove the anion from the polymer of pyrrole or co-polymer of pyrrole.

The alkoxides utilizable herein are any of the conventional alkoxides such as sodium or potassium methoxide. Of course, the methoxides are typically utilized in mixture with the alcohol corresponding to the alkoxide moiety. The solvent utilizable for removing the anion when a water-soluble base is utilized is conveniently water. It is, of course, however, possible to use mixtures of various solvents to obtain a greater effect in removal of the anion.

A concomitant effect of removing the anion from the polymer of pyrrole or co-polymer of pyrrole is to remove the acidic proton which is associated with a charged pyrrole ring. As the polymer of pyrrole or co-polymer of pyrrole is now deficient in a proton, the corresponding nitrogen atom on the polymer has an unshared electron pair. The deprotonated polymer then becomes a Lewis base thereby making it possible to associate any of several Lewis acids or Broensted acids species within the polymer matrix.

The polymer matrix is also useful in that the unshared pair of electrons on a nitrogen atom within the polymer of pyrrole or co-polymer of pyrrole may be covalently bonded to another species to provide an additional catalytic usage of the deprotonated polymer of pyrrole or co-polymer of pyrrole.

Suitable materials which may be bound into the matrix of the polymer of pyrrole or co-polymer of pyrrole include metallic catalysts such as transition metals or metallic ions such as ferric, ferrous, cupric, cuprous, manganic, nickel, osmium, ruthenium or aluminum or mixtures of the foregoing materials. Where a metallic cation is used, any appropriately associated anion may be present in the molecule. The catalyst support system is extremely effective because of the number of catalyst support sites that it provides on the pyrrole backbone. It is desirable that any associated ligands with the metallic species not be so large as to preclude other sites on the polymer of pyrrole or co-polymer of pyrrole from being blocked for usage.

Lewis acids which may be used as catalysts may also be introduced into the polymer of pyrrole or co-polymer of pyrrole following its deprotonation. Such catalytic materials include compounds such as bromine, iodine, boron trifluoride or sulfur trioxide or mixtures thereof.

It is also possible to reprotonate the deprotonated polymer of pyrrole or copolymer of pyrrole. It might be first asked why one would be interested in reprotonating a material which is protonated in its manufacture. The answer to this question is that it is possible to obtain a more active catalytic system by preparing the material such as by the electrodeposition method previously described, and subsequently treating the material as hereafter described. That is, the polymer of pyrrole or copolymer of pyrrole, following its electrochemical production with a material such as sodium lauryl sulfate included therein provides a material having a far greater surface area following removal of the lauryl sulfate anions. However, when reprotonating the polymer of pyrrole or copolymer of pyrrole with a material such as a mineral acid, it is possible to thereafter obtain a material having an extremely high surface area which is a protonated polymer of pyrrole or copolymer of pyrrole. Such acids as dihydroquinone sulfonic acid can be incorporated into the deprotonated polymer by mixing the acid in a solvent such as methanol. The dihydroquinone sulfonic acid is unstable under the conditions of electropolymerization and thus direct incorporation during polymerization is not possible.

Suitable materials which may be used to reprotonate the polymer of pyrrole or copolymer of pyrrole include any of the non-oxidative acids. Thus, mineral acid such as phosphoric, sulfuric or hydrochloric acids are suitable to reprotonate the polymer of pyrrole or copolymer of pyrrole. Organic acids such as quinone sulfonic acid or methane sulfonic acid may also be used to reprotonate the polymer of pyrrole or copolymer of pyrrole. In any event, the amount of acid employed is usually a slight excess over that required to completely associate a proton with the unpaired electron on the nitrogen atom. The slight excess of the acid is utilized for convenience considering the cost of polymer of pyrrole or copolymer of pyrrole.

The degree with which the polymer of pyrrole or copolymer of pyrrole is reprotonated is also a matter of choice directed to the eventual utility of the polymer of pyrrole or copolymer of pyrrole.

It is desirable that an acid such as nitric acid not be utilized, in that nitric acid can attack the polymeric backbone of the polymer of pyrrole or copolymer of pyrrole. Accordingly, any acid may be used to reprotonate the polymer of pyrrole or copolymer of pyrrole providing it does not substantially destroy the polymer backbone.

The following are examples of the present invention.

EXAMPLE A

A sample of a polymer of pyrrole corresponding to unsubstituted pyrrole which has a surface area of approximately 15 square meters per gram is obtained according to Example 1. The polypyrrole at 0.1 equivalents is placed in a glass reaction vessel which is sealed from the atmosphere. The polypyrrole has an equivalent weight of 509. Also added to the reaction vessel is 0.12 equivalent of potassium methoxide. Excess methanol provides additional solvent for the reaction. The potassium methoxide is extremely effective in removing protons from the polymer.

The reaction is maintained as close to 20° C. as is practical. The reaction is allowed to continue for a period of approximately 12 hours. Following this period of time, the deprotonated polypyrrole is filtered and washed in additional methanol.

Following the filtration and washing in methanol, the deprotonated polypyrrole is placed in an Soxhlet extractor for approximately 14 hours.

The deprotonated polypyrrole as obtained above has a surface area of approximately 50 square meters per gram.

EXAMPLE B

An aqueous mixture of 50.9 parts polypyrrole, and 1000 parts water from Example 1 is introduced to a sealed glass reaction vessel. The anion of the polymer is lauryl sulfate. The polypyrrole lauryl sulfate has an equivalent weight of 509. Potassium hydroxide (5.72 parts) is introduced to the aqueous mixture incrementally to provide an even reaction rate. The temperature of the reaction is maintained as close to room temperature as is possible.

The deprotonated polypyrrole is filtered, and washed in methanol, followed by stripping and drying of the filtrate. The deprotonated polypyrrole polymer is then dried in a vacuum oven.

EXAMPLE C

Polypyrrole is used as a support for copper by obtaining a polypyrrole which has been deprotonated according to Example A. Deprotonated polypyrrole in the amount of 5 parts is placed in a reaction vessel and 0.66 part of cupric chloride is added. The mixture is refluxed for five hours to obtain a copper complexed polypyrrole. The copper complexed polypyrrole is useful as an anti-oxidant catalyst to reduce peroxide.

EXAMPLE D

Polypyrrole which has been deprotonated according to Example B is reacted to give a polypyrrole complex of manganese suitable as a catalyst.

The deprotonated polypyrrole is reacted in an equivalent amount with manganese chloride.

The ingredients are placed in a glass reaction vessel and maintained at reflux under back pressure, of nitrogen for a period of approximately 5 hours. Following the 5 hour time period, the product is washed in methanol and dried in a vacuum oven. The prodict obtained is suitable as a manganese catalyst.

EXAMPLE E

Polypyrrole obtained from Example A is reacted with iodine to obtain an iodine polypyrrole complex.

Five parts of polypyrrole polymer obtained as above are added to three parts of iodine in 70 parts of methanol. The reaction is continued with heating to reflux for a period of 5 hours.

The iodine polypyrrole complex is then washed in methanol and then dried in a vacuum oven. The catalyst obtained from this example is useful as a Lewis acid catalyst.

EXAMPLE F

A polymer obtained according to Example A is utilized at 5 parts to 4.1 parts of nickel acetate tetrahydrate. Potassium carbonate in the amount of 2.2 parts is added to a glass reaction vessel which contains 60 parts of nitrobenzene. All the reactants are placed in the glass reaction vessel and heated to 120° C. The temperature is adjusted to 100° C. after the reaction has been initiated. The reaction mixture is held at 100° C. for approximately 5 hours.

The nickel doped polypyrrole polymer obtained in the present Example is then successively washed in nitrobenzene, methanol and water. This product is then filtered and dried.

The nickel catalyst obtained herein is suitable as an oxidation catalyst.

EXAMPLE G

The boron trifluoride adduct of a polypyrrole polymer is obtained in the following fashion. The polypyrrole is obtained as in Example A. Boron trifluoride ($BF_3$) is bubbled through toluene in a glass reaction vessel containing the deprotonated polypyrrole. The boron trifluoride is added over a period of about two hours at 20° C. The reaction vessel is then evacuated by purging with nitrogen gas for approximately one hour.

The reaction product so obtained is then washed in toluene, followed by an ether washing, filtration and drying.

The boron trifluoride reaction product of the polypyrrole polymer is useful as an alkylation catalyst.

EXAMPLE H

This example desribes the reprotonation of a deprotonated polypyrrole.

Deprotonated polypyrrole (5 parts) is placed in a flask containing 50 parts of distilled water. With stirring at room temperature, 5 parts of concentrated hydrochloric acid are added over 30 minutes. The product is stirred at room temperature for 2 hours, then filtered and washed 3 times with distilled water. After drying in vacuo at 80° C. for 4 hours, 5.1 gms of a black, conducting polymer is obtained. Chloride analysis is 13.3% indicating incorporation of the proton as the hydrochloride salt of the polymer. The product has conductivity of 1 S cm$^{-1}$.

EXAMPLE J

Into a clean, dry 500 ml roundbottom flask is placed 250 ml of anhydrous diethyl ether. Thereafter 2.0 gms of anhydrous iron (III) chloride is added. The mixture is slurried to obtain a solution of the iron salt. To this solution is slurried 3.0 gms of deprotonated polypyrrole from Example 1. The solution is then stirred for 3 hours at room temperature. The black powder is then filtered and washed 3 times with 50 ml aliquots of anhydrous diethyl ether. The product is dried at 80° C. under 1.32 KPa vacuum for 5 hours. Analysis of the powder shows 4.07% chloride and 3.01% iron by weight in the iron laden polymer.

EXAMPLE K

Deprotonated, iron-containing, polypyrrole from Example J is heat treated at 800° C. under an inert atmosphere (Argon) for 2 hours. This material is then tested in a ring and disk apparatus for oxygen-reduction catalytic activity according to the following procedure.

The oxygen reduction experiments are conducted with thin layer Teflon-bonded carbon electrodes. These electrodes are prepared by placing 25 mg of the deprotonated, iron containing polypyrrole powder in a small beaker. Distilled water is then added to the powder and the mixture agitated in an ultrasonic bath for about 30 mintues. Subsequently, a few ml of a dilute suspension of a Teflon emulsion (Dupont T 30B, 60% Teflon in water plus 7% Triton X-100 as a stabilizer) are added to the polypyrrole/water mixture without interrupting the agitation. The amount of Teflon used is sufficient to yield 10% w/w of Teflon in the polypyrrole matrix. This material is then filtered, kneaded with a spatula onto a Teflon sheet, and a small amount (2.5-3 mg) is applied onto a slightly recessed (0.1 ml deep) ordinary pyrolytic graphite disk of an otherwise conventional ring-disk electrode assembly. The surface is smoothened using a spatula so as to create a common plane with the rest of the electrode front end.

The oxygen reduction test is run at 20° C. in 0.1 M NaOH saturated with oxygen gas. The ring and disk procedure shows catalytic activity for oxygen reduction when compared to electrodes fabricated from carbon. A general discussion of electrode fabrication is found in J. Electroanal. Chem., 184 (1985) pp 419–426.

What is claimed is:

1. A process for preparing a pulverant catalytic composition comprising a polymer of pyrrole or a copolymer of pyrrole and mixtures thereof obtained by treating a pyrrole or a copolymerizable mixture of a pyrrole comprising the steps of:
    (a) obtaining a pyrrole or a copolymerizable mixture containing a pyrrole;
    (b) introducing to the pyrrole or copolymerizable mixture containing a pyrrole a peroxide;
    (c) reacting the mixture of the pyrrole or copolymerizable mixture containing a pyrrole and the peroxide for a sufficient amount of time to polymerize the pyrrole or the copolymerizable mixture containing a pyrrole,
    (d) treating the polymer of pyrrole or copolymer of pyrrole in the presence of a strong base to substantially increase the surface area of the polymer of pyrrole or copolymer of pyrrole, and
    (e) introducing to the high surface area polymer of pyrrole or copolymer of pyrrole material, thereby forming the catalytic composition.

2. The process of claim 1 wherein the catalytic active material is a Friedel Crafts catalyst.

3. The process of claim 1 wherein the catalytic active material is an oxygen reduction catalyst.

4. The process of claim 3 wherein the catalytic active material is a transition metal.

5. The process of claim 1 wherein the surface area of the polymer of pyrrole or copolymer of pyrrole prior to contact with the catalytic active material is at least about 25 square meters per gram.

6. The process of claim 1 wherein the catalytic active material is selected from the group consisting of ferric, ferrous, cupric, cuprous, manganic, nickel, osmium, ruthenium and aluminum ions and mixtures thereof.

7. The process of claim 1 wherein the catalytic active material is selected from the group consisting of bromium, iodine, boron triflouride and sulfur trioxide.

8. The process of claim 1 wherein the polymer of pyrrole or copolymer of pyrrole is reprotonated.

9. The process of claim 8 wherein the composition is reprotonated with a non-oxidative acid.

10. The process of claim 9 wherein the polymer of pyrrole or copolymer of pyrrole is reprotonated with a mineral acid selected from the group consisting of phosphoric, sulfuric, and hydrochloric or mixtures thereof.

11. The process of claim 9 wherein the composition is reprotonated with quinone sulfonic acid or methane sulfonic acid.

12. The process of claim 1 wherein the strong base is selected from the group consisting of alkali metal and alkaline earth metal hydroxides, alkoxides and amine bases.

* * * * *